US012625668B2

(12) United States Patent     (10) Patent No.:   US 12,625,668 B2

Chu et al.     (45) Date of Patent:   \*May 12, 2026

(54) DISPLAY SYSTEM

(71) Applicant: InnoLux Corporation, Miao-Li County (TW)

(72) Inventors: Wei-Ming Chu, Miao-Li County (TW); Yu-Chun Hsu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/671,002

(22) Filed: May 22, 2024

(65) Prior Publication Data

US 2024/0427549 A1   Dec. 26, 2024

Related U.S. Application Data

(60) Provisional application No. 63/509,039, filed on Jun. 20, 2023.

(30) Foreign Application Priority Data

Mar. 15, 2024   (CN) .......................... 202410298989.2

(51) Int. Cl.
   *G06F 3/147*     (2006.01)
   *F21V 8/00*     (2006.01)
       (Continued)

(52) U.S. Cl.
   CPC ................ *G06F 3/147* (2013.01); *G02B 1/11* (2013.01); *G02B 1/14* (2015.01); *G02B 6/0036* (2013.01);
       (Continued)

(58) Field of Classification Search
   CPC .......... G02B 1/11; G02B 1/14; G02B 6/0036; G02B 1/111; G02B 6/0031; G02B 6/0025; G02B 27/0101; G02B 5/30; G02B 5/0294; G02B 5/0205; G02B 5/3083; G02F 1/133504; G02F 1/133502;
       (Continued)

(56) References Cited

U.S. PATENT DOCUMENTS

2009/0315869 A1\* 12/2009 Sugihara ............ H04N 1/00352
                                     345/204
2018/0067233 A1\* 3/2018 Chen .................... G02B 5/3041
                 (Continued)

FOREIGN PATENT DOCUMENTS

CN        114153412 A     3/2022

*Primary Examiner* — Dismery Mercedes
(74) *Attorney, Agent, or Firm* — McClure, Qualey & Rodack, LLP

(57) ABSTRACT

A display system includes a host, a storage module and a display module coupled to the host. The host includes a transmission interface. The host communicates with a database via the transmission interface. The storage module stores the ownership information of the digital data. The host accesses the digital data from the database according to the ownership information, and the display module displays the digital data. The display module includes a display panel and an optical structure layer disposed on the display panel. The glossiness of the optical structure layer is 4 GU-35 GU, and the specular component include reflectance is 3%-6%.

22 Claims, 10 Drawing Sheets

(51) Int. Cl.

| | |
|---|---|
| *G02B 1/11* | (2015.01) |
| *G02B 1/14* | (2015.01) |
| *G02B 27/01* | (2006.01) |
| *G02F 1/1333* | (2006.01) |
| *G02F 1/1335* | (2006.01) |

(52) U.S. Cl.
CPC ... *G02B 27/0101* (2013.01); *G02F 1/133342* (2021.01); *G02F 1/133502* (2013.01); *G02F 1/133528* (2013.01)

(58) Field of Classification Search
CPC ......... G02F 1/133611; G02F 1/133602; G02F 1/133528; G02F 1/133342; G02F 1/133553; G06F 3/147
See application file for complete search history.

(56) References Cited

U.S. PATENT DOCUMENTS

| | | | |
|---|---|---|---|
| 2019/0219739 A1* | 7/2019 | Gregorski | C03C 17/3435 |
| 2020/0239360 A1* | 7/2020 | Minowa | B32B 7/023 |
| 2020/0301204 A1* | 9/2020 | Wang | G02F 1/133603 |
| 2022/0186046 A1* | 6/2022 | Sugiyama | C08K 9/06 |
| 2022/0358488 A1 | 11/2022 | Kidakarn | |
| 2023/0032209 A1* | 2/2023 | Becken | B32B 17/06 |
| 2023/0171992 A1* | 6/2023 | Kim | H10K 59/8791 |
| | | | 257/88 |
| 2024/0027811 A1* | 1/2024 | Hsu | G02B 6/0043 |
| 2024/0062178 A1* | 2/2024 | McDonnell | A63B 69/3632 |
| 2024/0077762 A1* | 3/2024 | Tu | G02F 1/133502 |
| 2024/0146832 A1* | 5/2024 | Jeong | H04M 1/0266 |
| 2024/0272342 A1* | 8/2024 | Kim | G02B 5/3033 |

* cited by examiner 50
503 {
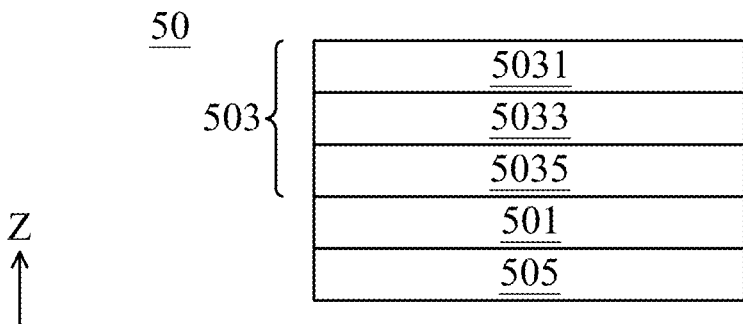
| 5031 |
| 5033 |
| 5035 |
| 501 |
| 505 |
Z
→X
FIG. 6A
505
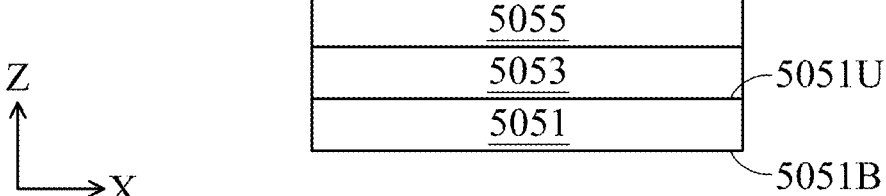
| 5055 |
| 5053 | —5051U |
| 5051 | |
| | —5051B |
Z
→X
FIG. 6B
505
| 5057 |
| 5055 |
| 5053 | —5051U |
| 5051 | |
| | —5051B |
Z
→X
FIG. 6C

DISPLAY SYSTEM

CROSS REFERENCE TO RELATED APPLICATIONS

This application claims the benefit of China Patent Application No. 202410298989.2, filed on Mar. 15, 2024, and provisional Application No. 63/509,039, filed Jun. 20, 2023, the entirety of which is incorporated by reference herein.

BACKGROUND OF THE INVENTION

Field of the Invention

The present disclosure relates to a display system, and in particular it relates to a display system including a display module.

Description of the Related Art

Interaction between technology and art has resulted in digital artwork. Artificial intelligence technology can improve the interactivity of digital works of art. Non-Fungible Token (NFT) technology can provide these digital artworks with uniqueness and immutability.

The digital artwork may include, but is not limited to, images, video, text, audio, and other forms of artwork. If the digital artwork is, for example, a picture, image or text, it may be presented on a display module.

BRIEF SUMMARY OF THE INVENTION

An embodiment of the present invention provides a display system. The display system includes a host, and a storage module and a display module coupled to the host. The host includes a transmission interface and communicates with a database via the transmission interface. The storage module stores the ownership information of the digital data. The host accesses the digital data from the database according to the ownership information, and the display module displays the digital data. The display module includes a display panel and an optical structure layer disposed on the display panel. The glossiness of the optical structure layer is 4 GU-35 GU, and a specular component include reflectance of the optical structure layer is 3%-6%.

An embodiment of the present invention provides a display system. The display system includes an image generation module and a display module coupled to the image generation module. The image generation module generates an image based on a prompt command input by a user, and the display module displays the image. The display module includes a display panel and an optical structure layer disposed on the display panel, wherein the optical structure layer has a glossiness of 4 GU-35 GU and a specular component include reflectance of 3%-6%.

BRIEF DESCRIPTION OF THE DRAWINGS

The present invention can be more fully understood by reading the subsequent detailed description and examples with references made to the accompanying drawings, wherein:

FIG. 6A is a schematic view of a display module including a backlight element according to an embodiment of the present disclosure;

FIG. 6B is a schematic view of a backlight element in the display module as shown in FIG. 6A according to an embodiment of the present disclosure;

FIG. 6C is a schematic view of a backlight element in the display module as shown in FIG. 6A according to another embodiment of the present disclosure;

DETAILED DESCRIPTION OF THE INVENTION

Figure 1:
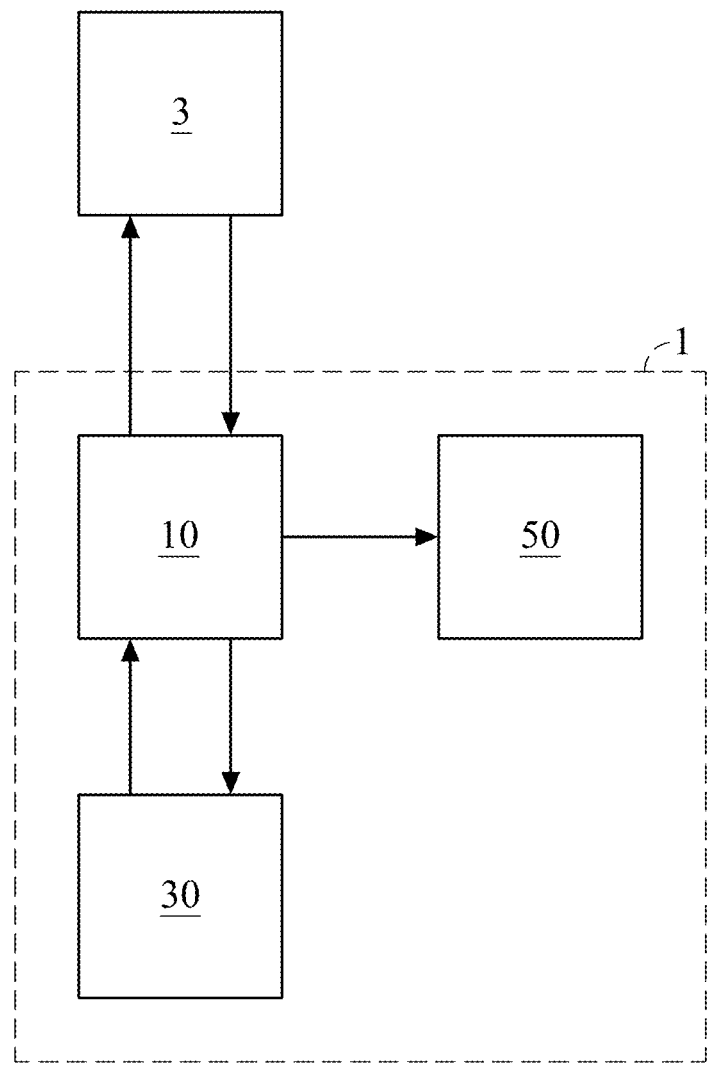
FIG. 1 is a schematic view of a display system according to an embodiment of the present disclosure.

The following description is made for the purpose of illustrating the general principles of the disclosure and should not be taken in a limiting sense. The scope of the disclosure is determined by reference to the appended claims. Reference will now be made in detail to exemplary embodiments of the present disclosure, examples of which are illustrated in the accompanying drawings. Whenever possible, the same reference numbers are used in the drawings and descriptions to refer to the same or similar parts.

The directional terms mentioned in the disclosure, such as "up", "down", "front", "back", "left", "right" only refer to the directions of the accompanying drawings. Therefore, the directional terms used herein are illustrative and not intended to limit the disclosure. It should be understood that if a device in an accompanying drawing is turned so that it is upside down, elements recited on the "bottom" side will become the elements on the "top" side. In the accompanying drawings, the drawings illustrate general features of the methods, structures and/or materials used in specific embodiments. However, these accompanying drawings should not be construed as defining or limiting the scope or property of what is covered by these embodiments. For example, relative sizes, thicknesses and positions of the various layers, regions and/or structures may be reduced or enlarged for clarity.

In the present disclosure, descriptions of a structure (or layer, element or substrate) being on/above another structure (or layer, element or substrate) may mean that the two structures are adjacent and directly connected, or that the two structures are adjacent and indirectly connected. Indirect connection means that there is at least one intermediate structure (or intermediate layer, intermediate element, intermediate substrate, intermediate spacer) between two structures. A lower surface of the structure is adjacent to or directly connected to an upper surface of the intermediate structure, and an upper surface of the other structure is adjacent to or directly connected to a lower surface of the intermediate structure. The intermediate structure may be a single-layer or multi-layer physical structure or a non-physical structure without limitation. In the disclosure, when a structure is disposed "on" another structure, it may mean that the structure is "directly" on the other structure, or that the structure is "indirectly" on the other structure, i.e. there is at least one structure between the one structure and the other structure.

Throughout the disclosure and the appended claims, some terms are used to refer to specific elements. Those skilled in the art will understand that manufacturers may refer to the same element by different names. The disclosure is not intended to differentiate between elements that have the same function but have different names.

In some embodiments of the present disclosure, unless otherwise defined, terms related to joining and connecting, such as "connection", "interconnection", etc., may mean that two structures are in direct contact, or may also mean that the two structures are not in direct contact (indirect contact) and other structures are between the two structures. The terms related to joining and connecting may also include the situation where both structures are movable or both structures are fixed. In addition, the term "coupled" includes a connection between two structures by means of a direct or indirect electrical connection.

In the disclosure, the terms "about", "equal to", "equal" or "the same", "substantially" or "approximately" usually indicates a value of a given value or range that varies within 20%, or a value of a given value or range that varies within 10%, within 5%, or within 3%, or within 2%, or within 1%, or within 0.5%. The term "ab" refers to a range that includes all values greater than or equal to a, less than or equal to b, and all values between a and b.

Ordinal numbers used in the specification and claims, such as "first", "second", etc., are used to modify elements. The ordinal numbers do not imply or represent numbers of the element (or elements). The ordinal numbers do not represent the order of one element over another or the order of manufacturing method. The ordinal numbers are only used to clearly distinguish two elements having the same name. The claims and the specification may not use the same terms. Therefore, the first element in the specification may be the second element in the claim.

It should be understood that according to the embodiments of the present disclosure, the depth, thickness, width or height of each element, or the space of the elements or the distance between them may be measured using an optical microscope (OM), a scanning electron microscope (SEM), a film thickness profile measuring gauge (α-step), an elliptical thickness gauge, or other suitable measurement methods. According to some embodiments, a scanning electron microscope may be used to obtain a cross-sectional structural image including the elements to be measured, and to measure the depth, thickness, width or height of each element, or the space or distance between the elements. In the present disclosure, a "glossiness" of an element is a value measured by a gloss meter at a position. An angle between a line connecting the position and the element and a normal direction (Z direction) of a surface of the element is 60 degrees. In this disclosure, transmittance and reflectance (e.g., specular component include reflectance and specular component exclude reflectance) refer to the transmittance and reflectance of light in the visible wavelength range.

The display module may include an electronic device. The display module may include an electronic device. The electronic device may include a display device, a backlight device, a sensing device, or a splicing device, but the disclosure is not limited thereto. The electronic device may be a bendable or flexible electronic device. The display device may be a non-self-luminous display device or a self-luminous display device. The antenna device may be a liquid crystal type antenna device or a non-liquid crystal type antenna device. Sensing device may be a sensing device that senses capacitance, light, heat energy or ultrasonic waves, but is not limited thereto. The splicing device may be, for example, a display splicing device or an antenna splicing device, but is not limited thereto. It should be noted that the electronic device may be arranged in any combination of the foregoing, but not limited thereto. The electronic device may include electronic elements. The electronic elements may include passive elements, and/or active elements, such as capacitors, resistors, inductors, diodes, transistors, etc., but are not limited thereto. The diodes may include light emitting diodes or photodiodes. The light emitting diodes may include, for example, organic light emitting diodes (OLEDs), submillimeter light emitting diodes (mini LEDs), micro light emitting diodes (micro LEDs), quantum dot light emitting diodes (quantum dot LEDs), but are not limited thereto.

Unless otherwise defined, all terms (including technical and scientific terms) used herein have the same meaning as commonly understood by a person skilled in the art to which the disclosure pertains. It will be further understood that terms, such as those defined in commonly used dictionaries, should be interpreted as having a meaning consistent with the relevant technology and the context or background of this disclosure and will not be interpreted in an idealized or overly formal sense unless expressly so defined herein.

The present disclosure may be understood by reference to the following detailed description in conjunction with the accompanying drawings. It should be noted that for ease of understanding by the reader and for the sake of simplicity of the drawings, only a portion of the display system is shown in drawings of the present disclosure, and specific elements in the drawings are not shown to actual scale. In addition, the number and size of the elements in the drawings are for illustrative purposes only and are not intended to limit the scope of this disclosure.

An embodiment of the present disclosure provides a display system. FIG. 1 is a schematic view of a display system 1 according to an embodiment of the present disclosure. The display system 1 of the present disclosure can be used to display the digital data stored in a database 3.

The digital data may include a digital artwork. In some embodiments, examples of the digital artwork may include, but are not limited to, images, videos, text, or artworks in other visual forms. In some embodiments, the database 3 may be in a Universal Serial Bus (USB) device or the Internet. The Internet may include a client/server network and a peer-to-peer network system. The peer-to-peer network system may include block chains. In some embodiments, the database 3 including the digital data may be stored in the block chains, but the present disclosure is not limited thereto. In some embodiments, the database 3 including the digital data may be stored in a USB device.

The display system 1 of the present disclosure includes a host 10 and a storage module 30 and a display module 50 coupled to the host 10, as shown in FIG. 1. The host 10 may include a transmission interface and may communicate with the database 3 via the transmission interface. The storage module 30 stores the ownership information of the digital data, and the host 10 may access the digital data from the database 3 based on the ownership information and display the digital data by the display module 50. The display module 50 includes a display panel 501 and an optical structure layer 503 disposed on the display panel 501, wherein the optical structure layer 503 has a glossiness of 4 GU-35 GU and a specular component include reflectance of 3%-6%.

The host 10 communicates with the database 3 via the transmission interface. Examples of transmission interfaces in the host 10 may include, but are not limited to: an Ethernet interface, an Internet interface, a telecommunication interface, a Universal Serial Bus (USB) interface, or other similar interfaces. The transmission interface in the host 10 may vary depending on the location of the database 3. For example, in embodiments where the database 3 is stored in a block chain, the transmission interface in the host 10 may be an internet interface. In embodiments where the database 3 is stored in a USB device, the transmission interface in the host 10 may be a USB interface.

In order to make the present disclosure easier to understand, the operation of the display system of the present disclosure is described below in an embodiment in which the database 3 is stored in a block chain. In the embodiment in which the database 3 is stored in a block chain, the transmission interface in the host 10 may be an Internet interface. After verifying the identity of the user, a digital data transfer message is sent to the block chain. After receiving the digital data transfer message, the block chain sends the ownership information of the digital data to the host 10 via the Internet interface in the host 10, and the host 10 stores the received ownership information of the digital data in the storage module 30. When the user wishes to display the digital data, the host 10 accesses the digital data from the database 3 via the Internet interface based on the ownership information stored in the storage module 30 and displays the digital data by the display module 50.

The display module 50 for displaying the digital data may include any suitable display module, such as a liquid crystal display module, a cholesteric liquid crystal display module, an electrophoretic display module, an organic light-emitting diode (LED) display module, a submillimeter LED display module, a micro-emitting diode (MED) display module, or a quantum dot light-emitting diode (QDLED) display module, but the disclosure is not limited thereto. In some embodiments, the display module 50 may include a liquid crystal display module. In some embodiments, the display module 50 has a glossiness of 0-10 GU or 0-5 GU. In some embodiments, the display module 50 has a specular component include (SCI) reflectance of 0.5-3%. In some embodiments, the specular component exclude (SCE) reflectance of the display module 50 is greater than 0.6 times the specular component include (SCI) reflectance of the display module 50. By providing a glossiness of less than 10 GU or less than 5 GU, a specular component include (SCI) reflectance of less than 3%, and a specular component exclude (SCE) reflectance greater than 0.6 times the specular component include (SCI) reflectance of the display module 50, the display module 50 can visually have a paper-like effect.

The display module 50 may include a display panel 501 and an optical structure layer 503 disposed on the display panel 501. In some embodiments, the display panel 501 may include, for example, an LCD panel, a cholesterol LCD panel, an electrophoretic display panel, an organic light-emitting diode (OLED) panel, a submillimeter light-emitting diode (SMED) panel, a micro-light-emitting diode (MLD) panel, or a quantum dots (QDD) panel, but the present disclosure is not limited thereto. In some embodiments, the display panel 501 may include a polarizer, but the present disclosure is not limited thereto. In some embodiments, the display panel 501 does not include a polarizer. In some embodiments, in two directions perpendicular to a normal direction (Z direction) of the display module 50, a length ratio (e.g., length in X direction:length in Y direction) of the display panel 501 may be 1:1, 3:2, 4:3, 5:4, 16:9, 16:10, 18:9, 21:9, or 32:9, but the present disclosure is not limited thereto.

The optical structure layer 503 disposed on the display panel 501 may have a glossiness of 5 GU-50 GU, 4 GU-35 GU, 4 GU-30 GU, or 4 GU-20 GU. In some embodiments, the optical structure layer 503 may have a specular component include reflectance of less than 6%, between 3% and 6%, or between 4% and 6%. In some embodiments, the optical structure layer 503 may have a transmittance of 70%-95%.

Figure 2A:
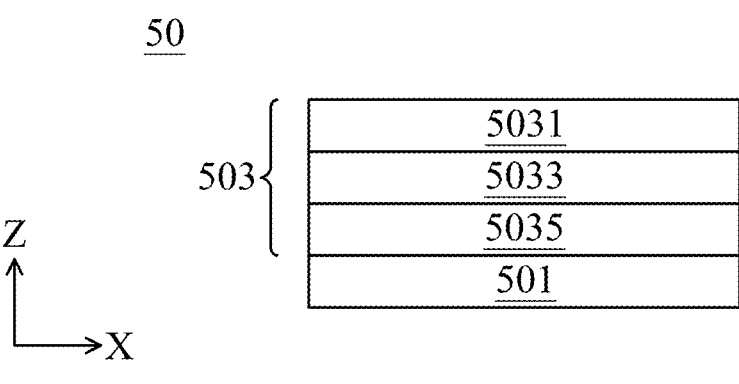
FIG. 2A is a schematic view of a display module according to an embodiment of the present disclosure.
Figure 3A:
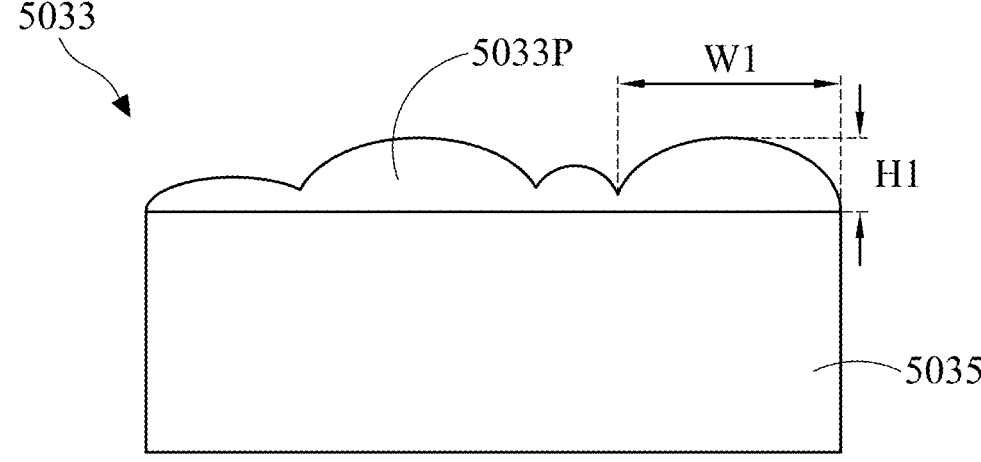
FIG. 3A is an enlarged schematic view of an anti-glare layer according to an embodiment of the present disclosure.
Figure 3A:
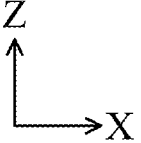
Figure 3B:
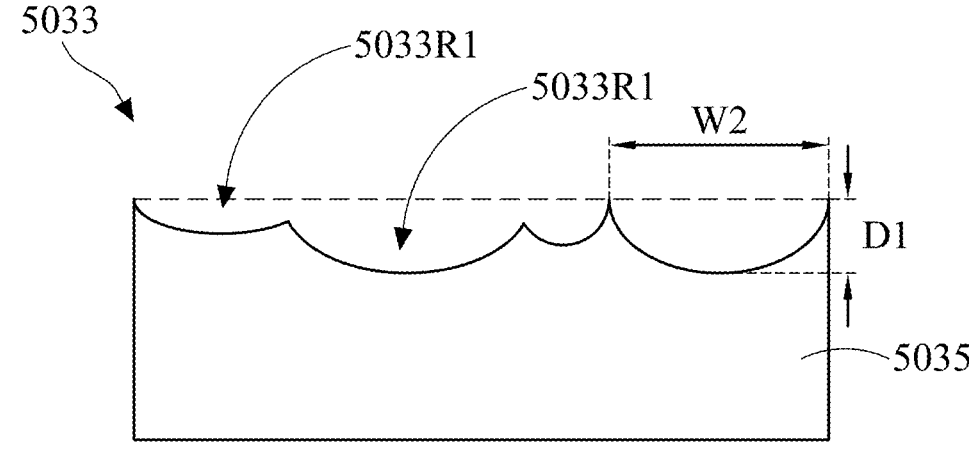
FIG. 3B is an enlarged schematic view of an anti-glare layer according to another embodiment of the present disclosure.
Figure 3B:
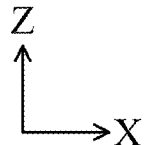
Figure 5:
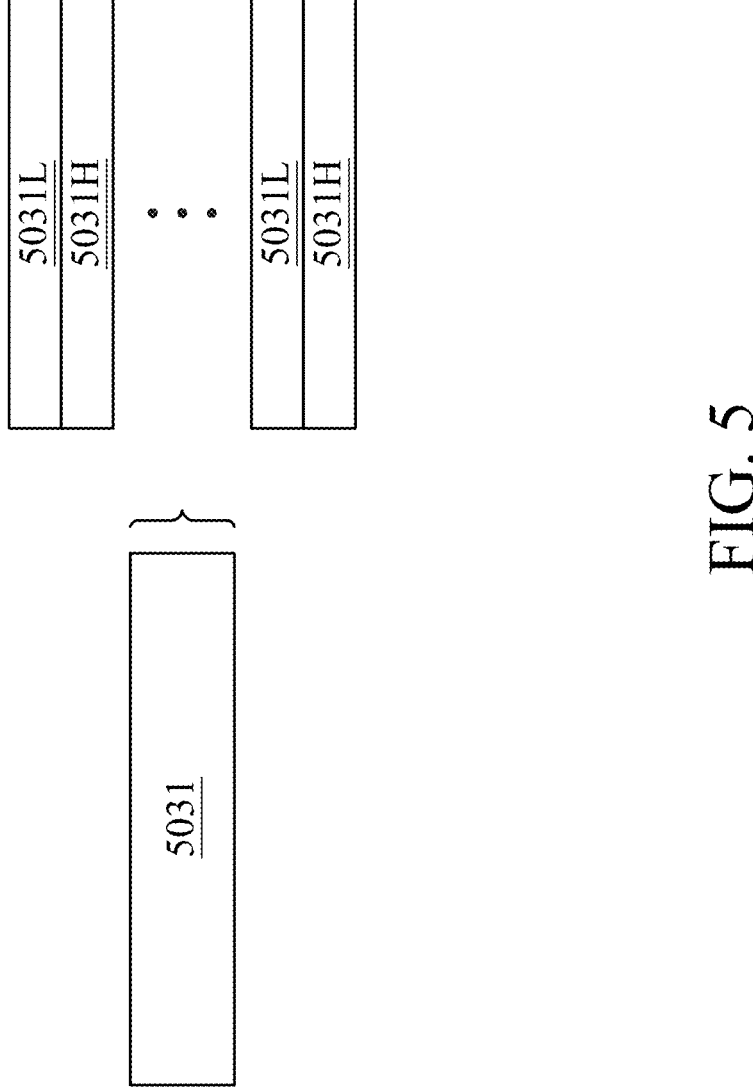
FIG. 5 is a schematic view of an anti-reflective layer according to an embodiment of the present disclosure.

In some embodiments, the optical structure layer 503 may include an anti-reflective layer 5031 and an anti-glare layer 5033, and the anti-reflective layer 5031 may be disposed on the anti-glare layer 5033. Specifically, in the normal direction (Z direction) of the display module 50, the anti-glare layer 5033 may be disposed between the anti-reflective layer 5031 and the display panel 501. FIG. 2A is a schematic view of a display module 50 according to an embodiment of the present disclosure. FIG. 3A is an enlarged schematic view of an anti-glare layer 5033 in the display module 50 of FIG. 2A according to an embodiment of the present disclosure. FIG. 3B is an enlarged schematic view of an anti-glare layer 5033 in the display module 50 of FIG. 2A according to another embodiment of the present disclosure. FIG. 5 is a schematic view of an anti-reflective layer 5031 according to an embodiment of the present disclosure. The structure of the optical structure layer 503 in the display module 50 of an embodiment of the present disclosure is further described below with FIG. 2A, FIG. 3A, FIG. 3B, and FIG. 5.

In some embodiments that the display panel 501 in the display module 50 includes a polarizer, the optical structure layer 503 disposed on the display panel 501 may include an anti-reflective layer 5031, an anti-glare layer 5033, and a cover glass 5035, as shown in FIG. 2A. The cover glass 5035 may include a tempered glass or a non-tempered glass. In some embodiments, the cover glass 5035 may include an alkaline aluminosilicate glass, an alkali boron aluminosilicate glass, a soda-lime glass, or other suitable glass materials, but the present disclosure is not limited thereto. The cover glass 5035 may include a lower surface adjacent to the display panel 501 and an upper surface opposite to the lower surface. In some embodiments, the anti-glare layer 5033 may be disposed on the upper surface of the cover glass 5035. That is, in the normal direction (Z direction) of the display module 50, the cover glass 5035 may be disposed between the display panel 501 and the anti-glare layer 5033, and the anti-glare layer 5033 may be disposed between the cover glass 5035 and the anti-reflective layer 5031, as shown in FIG. 2A, but the present disclosure is not limited thereto. In some embodiments, the anti-glare layer 5033 may be disposed on both the upper surface and the lower surface of the cover glass 5035.

In some embodiments, the anti-glare layer 5033 may be disposed on the upper surface of the cover glass 5035 by a spray process, but the present disclosure is not limited thereto. In some embodiments, the anti-glare layer 5033 may be disposed on both the upper surface and the lower surface of the cover glass 5035. The anti-glare layer 5033 formed using the spray process may have a structure as shown in FIG. 3A. The embodiment that the anti-glare layer 5033 is disposed on the upper surface of the cover glass 5035 by a spray process is used as an example to illustrate the structure of the anti-glare layer 5033 and the method of producing the anti-glare layer 5033 below in conjunction with FIG. 3A.

In the embodiment shown in FIG. 3A, a spray process for forming the anti-glare layer 5033 may include spraying a silicon oxide solution comprising silicon dioxide ($SiO_2$) onto the upper surface of the cover glass 5035 and curing the silicon oxide solution to form the anti-glare layer 5033. In some embodiments, the silicon oxide solution may be cured by a high temperature process, but the present disclosure is not limited thereto. The resulting anti-glare layer 5033 has an upper surface away from the upper surface of the cover glass 5035 and the upper surface of the anti-glare layer 5033 has a roughness. Specifically, the upper surface of the anti-glare layer 5033 may include a plurality of protrusions 5033P. In some embodiments, the protrusion 5033P has a height H1 in the Z direction and a width W1 in a direction (e.g., the X direction) perpendicular to the Z direction. The height H1 herein may be a distance between a peak of the protrusion 5033P and the upper surface of the cover glass 5035. The width W1 here may be a distance measured between the lowest points (valley) on either side of the protrusion 5033P along a line passing through a center of the protrusion 5033P. In some embodiments, the height H1 of the protrusion 5033P may be between 0.1-0.5 μm, and the width W1 of the protrusion 5033P may be between 5-20 μm. The plurality of protrusions 5033P may have the same or different heights H1 and may have the same or different widths W1.

In other embodiments, the anti-glare layer 5033 may be disposed on the upper surface of the cover glass 5035 by an etching process, but the present disclosure is not limited thereto. In some embodiments, the anti-glare layer 5033 may be disposed on both the upper surface and the lower surface of the cover glass 5035. The anti-glare layer 5033 formed using the etching process may have a structure as shown in FIG. 3B and may have superior acid and alkali resistance and provide better durability. The embodiment that the anti-glare layer 5033 is disposed on the upper surface of the cover glass 5035 by an etching process is used as an example to illustrate the structure of the anti-glare layer 5033 and the method of producing the anti-glare layer 5033 below in conjunction with FIG. 3B.

In the embodiment shown in FIG. 3B, the etching process for forming the anti-glare layer 5033 may include etching the upper surface of the cover glass 5035 using an etching solution to form the anti-glare layer 5033 on the upper surface of the cover glass 5035. In some embodiments, the etching solution may be an acid etching solution, but the present disclosure is not limited thereto. The resulting anti-glare layer 5033 has an upper surface that away from the upper surface of the cover glass 5035 and the upper surface of the anti-glare layer 5033 has a roughness. Specifically, the upper surface of the anti-glare layer 5033 may include a plurality of first depressions 5033R1. In some embodiments, the first depression 5033R1 has a depth D1 in the Z direction and a width W2 in a direction (e.g., the X direction) perpendicular to the Z direction. The depth D1 herein may be a distance between a lowest point of the first depression 5033R1 and the upper surface of the unetched cover glass 5035. The width W2 herein may be a distance measured between the highest points (peak) on either side of the first depression 5033R1 along a line passing through a center of the first depression 5033R1. In some embodiments, the depth D1 of the first depression 5033R1 may be between 0.1-0.5 μm, and the width W2 of the first depression 5033R1 may be between 5-20 μm. The plurality of first depression 5033R1 may have the same or different depths D1 and may have the same or different widths W2.

In some embodiments, a combination of the anti-glare layer 5033 having the above structure and the cover glass 5035 has a glossiness of between 10 GU and 50 GU and a transmittance of greater than 90%, but the present disclosure is not limited thereto.

In some embodiments, the anti-reflective layer 5031 may be disposed on the anti-glare layer 5033 using a deposition process. In some embodiments, the anti-reflective layer 5031 may have a thickness of 200-700 nm in the Z direction. Examples of the deposition processes may include a physical vapor deposition (PVD), a chemical vapor deposition (CVD), other suitable deposition processes, or any combination thereof. In some embodiments, the anti-reflective layer 5031 may be formed using a physical deposition process to alternately deposit a high refractive index material and a low refractive index material to form the anti-reflective layer 5031 comprising a plurality of high refractive index sub-layers 5031H and a plurality of low refractive index sub-layers 5031L stacked alternately with each other as shown in FIG. 5. In some embodiments, the low refractive index material may include a material having a refractive index less than or equal to 1.6. Examples of the low refractive index material may include silicon oxides ($SiO_x$), but the present disclosure is not limited thereto. In some embodiments, the high refractive index material may include a light-absorbing material or a non-light-absorbing material having a refractive index greater than or equal to 1.9. In this embodiment, the term "light-absorbing material" refers to a material having an extinction coefficient of 0.01-0.05, and the term "non-absorbing material" refers to a material having an extinction coefficient of less than 0.01. Examples of the non-absorbing material of the high refractive index material include niobium oxides (NbOx), silicon nitrides (SiNx), and combinations thereof, but the disclosure is not limited thereto. An example of light-absorbing material used in the high refractive index material is indium tin oxide (ITO), but this disclosure is not limited thereto.

In some embodiments, the anti-reflective layer 5031 has a high refractive index sub-layer 5031H closest to the cover glass 5035 and a low refractive index sub-layer 5031L furthest away from the cover glass 5035. In some embodiments, a sum of the number of the high refractive index sub-layers 5031H and the low refractive index sub-layers 5031L in the anti-reflective layer 5031 may be greater than or equal to 4. That is, the anti-reflective layer 5031 includes at least two high refractive index sub-layers 5031H and two low refractive index sub-layers 5031L. The anti-reflective layer 5031 including stacked the high refractive index sub-layers 5031H and the low refractive index sub-layers 5031L may have a specular component include reflectance of 3%-6%.

By virtue of the optical structure layer 503 having a structure as described above, the optical structure layer 503 of the present disclosure may have a glossiness of 5 GU-50 GU, 4 GU-35 GU, 4 GU-30 GU, or 4 GU-20 GU; a specular component include reflectance of less than 6%, between 3% and 6%, or between 4% and 6%; and a transmittance of 70%-95%.

Figure 2B:
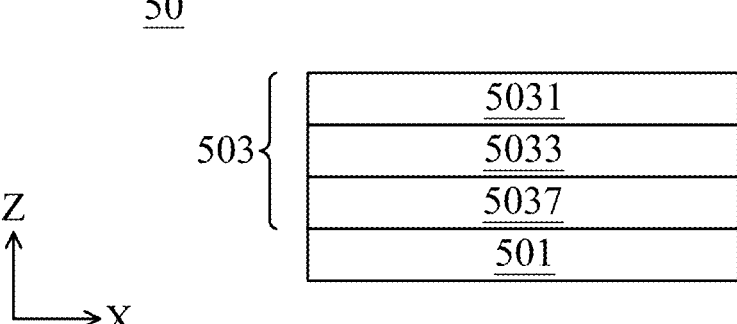
FIG. 2B is a schematic view of a display module according to another embodiment of the present disclosure.
Figure 4A:
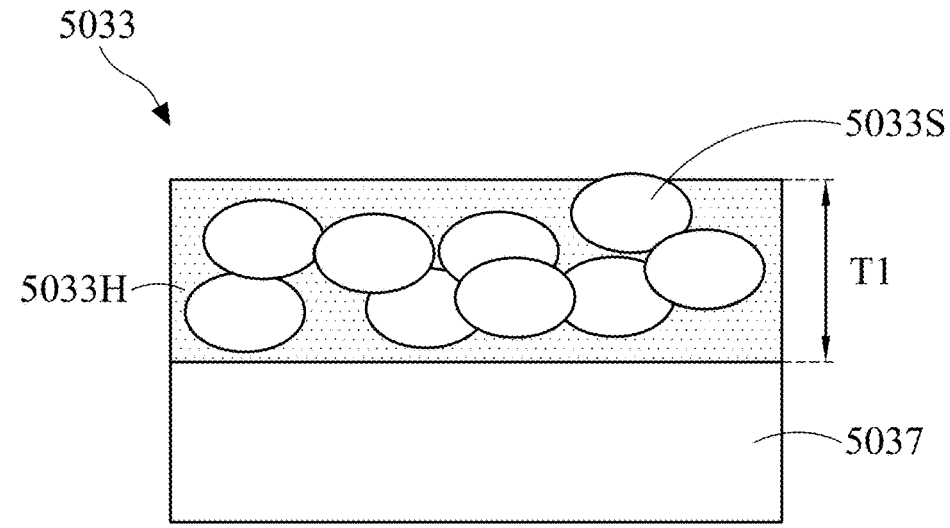
FIG. 4A is an enlarged schematic view of an anti-glare layer according to an embodiment of the present disclosure.
Figure 4B:
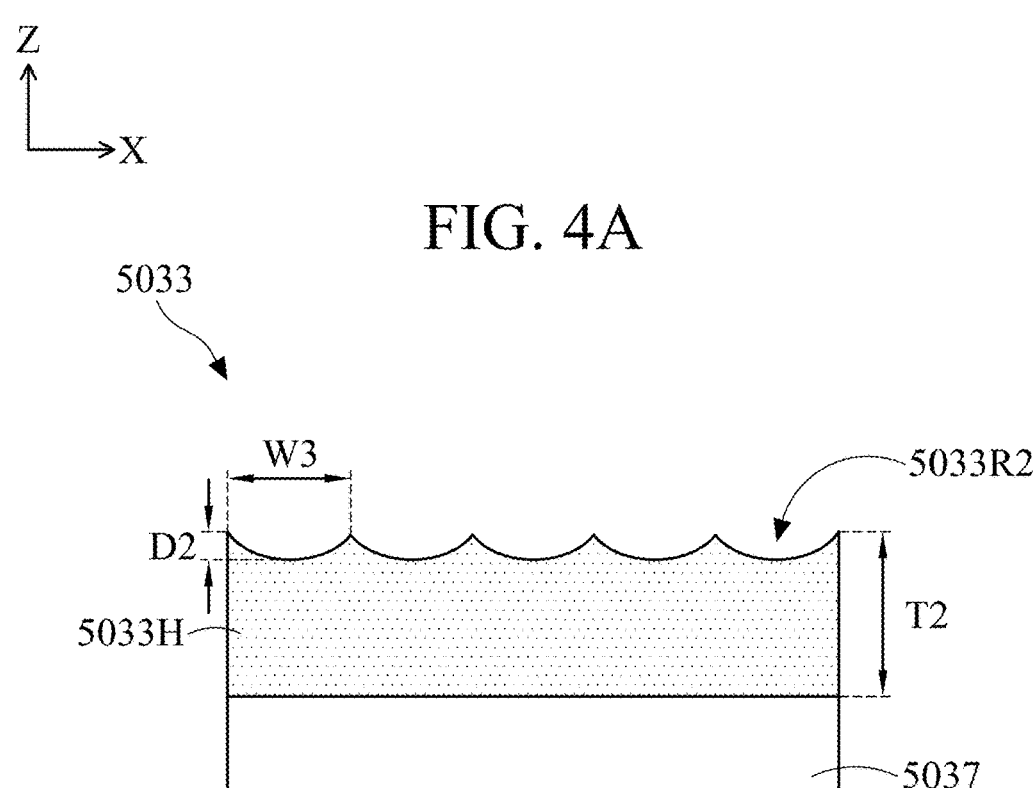
FIG. 4B is an enlarged schematic view of an anti-glare layer according to another embodiment of the present disclosure.
Figure 4B:
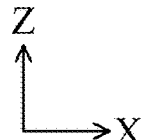

The optical structure layer 503 disclosed herein is not limited to the structures shown above with reference to FIG. 2A, FIG. 3A, FIG. 3B, and FIG. 5. The optical structure layer 503 of the present disclosure may also have other structures. FIG. 2B is a schematic view of a display module 50 according to another embodiment of the present disclosure. FIG. 4A is an enlarged schematic view of an anti-glare layer 5033 in the display module 50 of FIG. 2B according to an embodiment of the present disclosure. FIG. 4B is an enlarged schematic view of an anti-glare layer 5033 in the display module 50 of FIG. 2B according to another embodiment of the present disclosure. The structure of the optical structure layer 503 of another embodiment of the present disclosure is further described below with FIG. 2B, FIG. 4A, FIG. 4B, and FIG. 5.

In some embodiments, the optical structure layer 503 may include an anti-reflective layer 5031, an anti-glare layer 5033, and a cover film 5037, as shown in FIG. 2B. The cover film 5037 may include a polyimide film (PI film), a polyester film (PET film), a cellulose triacetate film (TAC film), a super retarder (super birefringent) film (TAC film), or other suitable film materials, but the present disclosure is not limited thereto. The cover film 5037 may be adjacent to the upper surface of the display panel 501. In some embodiments, the anti-glare layer 5033 may be disposed on the upper surface of the cover film 5037. That is, in the normal direction (Z direction) of the display module 50, the cover film 5037 may be disposed between the display panel 501 and the anti-glare layer 5033, and the anti-glare layer 5033 may be disposed between the cover film 5037 and the anti-reflective layer 5031, as shown in FIG. 2B, but the present disclosure is not limited thereto. In some embodiments, the anti-glare layer 5033 may be disposed on both the upper surface and the lower surface of the cover film 5037.

In some embodiments, the anti-glare layer 5033 may be disposed on the upper surface of the cover film 5037 by a coating process, but the present disclosure is not limited thereto. In some embodiments, the anti-glare layer 5033 may be disposed on both the upper surface and the lower surface of the cover film 5037. The anti-glare layer 5033 formed using the coating process may have a structure as shown in FIG. 4A. The embodiment that the anti-glare layer 5033 is disposed on the upper surface of the cover film 5037 by a coating process is used as an example to illustrate the structure of the anti-glare layer 5033 and the method of producing the anti-glare layer 5033 below in conjunction with FIG. 4A.

In the embodiment shown in FIG. 4A, the coating process for forming the anti-glare layer 5033 may include forming blended materials on the upper surface of the cover film 5037 to form the anti-glare layer 5033 on the upper surface of the cover film 5037. The blended materials used to form the anti-glare layer 5033 may include silica ($SiO_2$) particles and a hard coating material. The hard coating material may include poly (methyl methacrylate) and mixtures thereof, but the present disclosure is not limited thereto. In some embodiments, the particle size of the silica particle may be between 5-20 μm. The plurality of silica particles may have the same or different particle sizes. The resulting anti-glare layer 5033 includes a hard coating material layer 5033H and the silica particles 5033S dispersed in the hard coating material layer 5033H. In some embodiments, in the Z direction, the hard coating material layer 5033H may have a thickness T1 of 1-3 μm. The silica particles 5033S may be dispersed uniformly in the hard coating material layer 5033H. In some embodiments, the silica particles 5033S may protrude from the hard coating material layer 5033H, as shown in FIG. 4A, but the present disclosure is not limited thereto.

In some embodiments, the anti-glare layer 5033 may be disposed on the upper surface of the cover film 5037 by a nano-imprint process, but the present disclosure is not limited thereto. In some embodiments, the anti-glare layer 5033 may be disposed on both the upper surface and the lower surface of the cover film 5037. The anti-glare layer 5033 formed using the nano-imprint process may have a structure as shown in FIG. 4B. The embodiment that the anti-glare layer 5033 is disposed on the upper surface of the cover film 5037 by a nano-imprint process is used as an example to illustrate the structure of the anti-glare layer 5033 and the method of producing the anti-glare layer 5033 below in conjunction with FIG. 4B.

In the embodiment shown in FIG. 4B, the nano-imprint process for forming the anti-glare layer 5033 may include forming a coating material layer on the upper surface of the cover film 5037, imprinting a pattern onto the coating material layer using a mold having a desired pattern, and curing the coating material layer having the pattern to form the anti-glare layer 5033. The resulting anti-glare layer 5033 includes a hard coating material layer 5033H and a plurality of second depressions 5033R2. In some embodiments, the hard coating material layer 5033H may have a thickness T2 of 1 to 3 μm in the Z direction. In some embodiments, the hard coating material layer 5033H may have an upper surface away from the upper surface of the cover film 5037. The plurality of second depressions 5033R2 are at the upper surface of the hard coating material layer 5033H. The second depression 5033R2 has a depth D2 in the Z direction and a width W3 in a direction (e.g., the X direction) perpendicular to the Z direction. The depth D2 herein may be a distance between a lowest point of the second depression 5033R2 and the upper surface of the hard coating material layer 5033H. The width W3 herein may be a distance measured between the highest points (peak) on either side of the second depression 5033R2 along a line passing through a center of the second depression 5033R2. In some embodiments, the depth D2 may be between 0.1-0.5 μm and the width W3 may be between 5-20 μm. The plurality of second depression 5033R2 may have the same or different depths D2 and may have the same or different widths W3.

The anti-reflective layer 5031 in the display module 50 shown in FIG. 2B is substantially the same as the anti-reflective layer 5031 in the display module 50 shown in FIG. 2A, and is therefore not repeated herein.

By virtue of the optical structure layer 503 having a structure as described above, the optical structure layer 503 of the present disclosure may have a glossiness of 5 GU-50 GU, between 4 GU-35 GU, 4 GU-30 GU, or 4 GU-20 GU; a specular component include reflectance of less than 6%, between 3% and 6%, or between 4% and 6%; and a transmittance of between 70% and 95%.

Figure 2C:
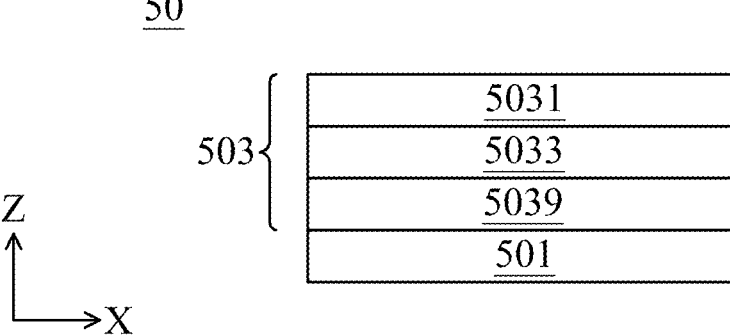
FIG. 2C is a schematic view of a display module according to further another embodiment of the present disclosure.

The optical structure layer 503 described above with reference to FIGS. 2A and 2B is an aspect in which the display panel 501 in the display module 50 includes a polarizer. In the embodiments that the display panel 501 in the display module 50 does not include a polarizer, the optical structure layer 503 of the present disclosure may have a structure as shown in FIG. 2C. FIG. 2C is a schematic view of the display module 50 according to another embodiment of the present disclosure. The structure of the optical structure layer 503 shown in FIG. 2C may be substantially the same as that of the optical structure layer 503 shown in FIG. 2B, except that the cover film 5037 is replaced by a polarizer 5039, and is therefore not repeated herein.

In some embodiments, the display module 50 in the display system 1 may further include a backlight element 505 disposed below the display panel 501. In some embodiments, the backlight element 505 may be a local dimming backlight element, but the present disclosure is not limited thereto. FIG. 6A is a schematic view of a display module 50 including a backlight element 505 according to an embodiment of the present disclosure. As shown in FIG. 6A, the display module 50 may include a display panel 501, a backlight element 505, and an optical structure layer 503, wherein the display panel 501 may be disposed between the optical structure layer 503 and the backlight element 505 in the normal direction (Z direction) of the display module 50. The optical structure layer 503 may include an anti-reflective layer 5031, an anti-glare layer 5033, and a cover glass 5035, as shown in FIG. 2A, but the present disclosure is not limited thereto. In some embodiments, the optical structure layer 503 may include a structure as shown in FIG. 2B or FIG. 2C.

FIG. 6B is a schematic view of a backlight element 505 in the display module 50 as shown in FIG. 6A according to an embodiment of the present disclosure. In some embodiments, the backlight element 505 may include a light guide plate 5051, a light source (not shown), an upper diffuser layer 5055, and a lower diffuser layer 5053. The light guide plate 5051 may have a light-out surface 5051U and a bottom surface 5051B relative to the light-out surface 5051U. The upper diffuser layer 5055 and the lower diffuser layer 5053 may be disposed on the light-out surface 5051U of the light guide plate 5051. In some embodiments, in the normal direction (Z direction) of the display module 50, the lower diffuser layer 5053 may be disposed between the light guide plate 5051 and the upper diffuser layer 5055, and the upper diffuser layer 5055 may be disposed between the lower diffuser layer 5053 and the display panel 501. In some embodiments, the backlight element 505 may further include a reflective element (not shown) on the bottom surface 5051B of the light guide plate 5051, and the light guide plate 5051 may be disposed between the reflective element and the lower diffuser layer 5053 in the normal direction (Z direction) of the display module 50. In some embodiments, the light source is disposed adjacent to a side surface of the light guide plate 5051.

In some embodiments, FIG. 6C is a schematic view of a backlight element 505 in the display module 50 as shown in FIG. 6A according to another embodiment of the present disclosure. In some embodiments, the backlight element 505 may include a light guide plate 5051, an upper diffuser layer 5055, a lower diffuser layer 5053, and a reflective dual brightness enhancement film (DBEF) 5057. The light guide plate 5051 may have a light-out surface 5051U and a bottom surface 5051B relative to the light-out surface 5051U. The upper diffuser layer 5055, the lower diffuser layer 5053, and the reflective dual brightness enhancement film 5057 may be disposed on the light-out surface 5051U of the light guide plate 5051. In some embodiments, the lower diffuser layer 5053 may be disposed between the light guide plate 5051 and the upper diffuser layer 5055, and the upper diffuser layer 5055 may be disposed between the lower diffuser layer

5053 and the reflective dual brightness enhancement film 5057, in the normal direction (Z direction) of the display module 50. In some embodiments, the backlight element 505 may further include a reflective element (not shown) on the bottom surface 5051B of the light guide plate 5051, and the light guide plate 5051 may be disposed between the reflective element and the lower diffuser layer 5053 in the normal direction (Z direction) of the display module 50.

Figure 7:
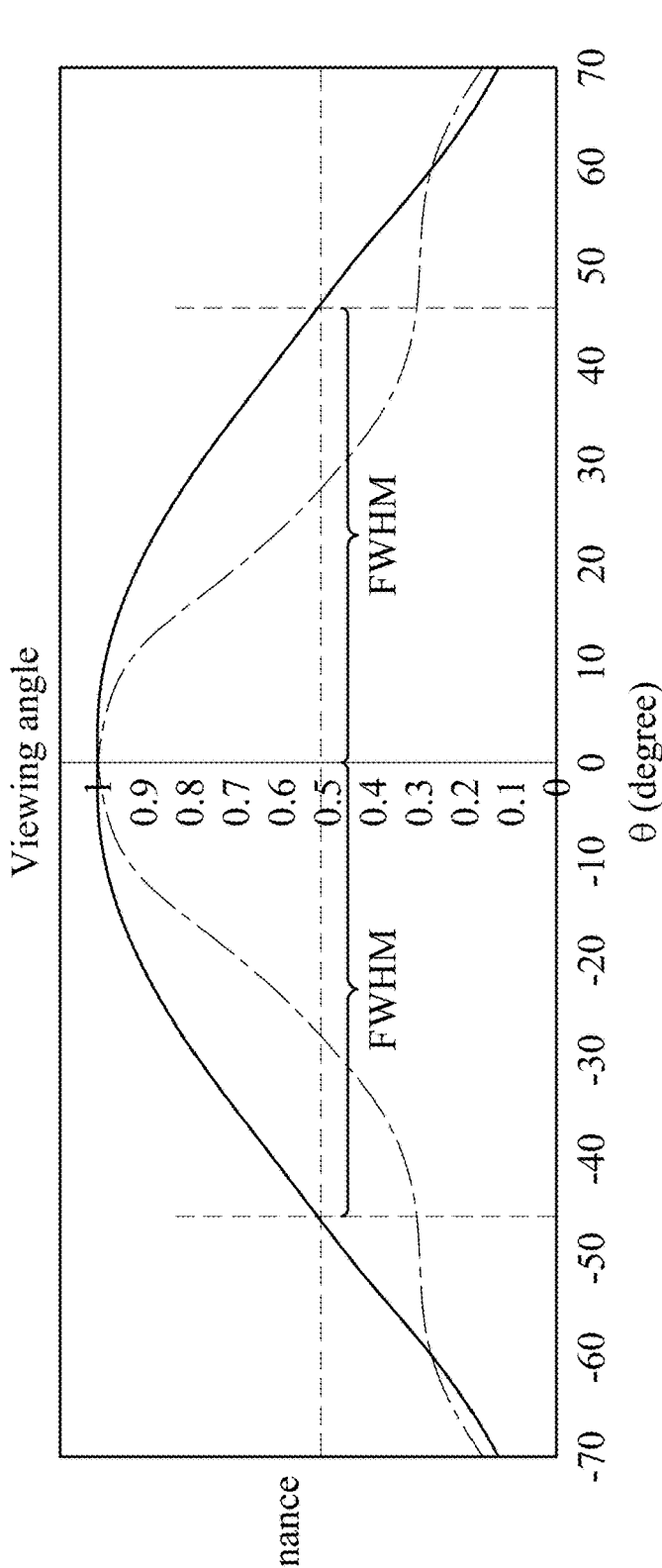
FIG. 7 is a full width at half maximum spectrum of the display module shown in FIG. 6A according to another embodiment of the present disclosure.

The backlight element 505 may or may not include a brightness enhancement film (X-BEF) having a prismatic structure. The brightness enhancement film (X-BEF) having a prismatic structure may change a full width at half maximum (FWHM) of the display module 50. The term "full width at half maximum" indicates a difference between a viewing angle when the display module 50 is at half maximum luminance and a viewing angle of 0°. FIG. 7 is a full width at half maximum spectrum of the display module 50 as shown in FIG. 6A according to another embodiment of the present disclosure. Specifically, FIG. 7 shows a full width at half maximum spectrum of two display modules 50. The backlight element 505 of one of the two display modules 50 includes sequentially stacked the reflective element, the light guide plate 5051, the lower diffuser layer 5053, and the upper diffuser layer 5055. The backlight element 505 of another one of the two display modules 50 includes sequentially stacked the reflective element, the light guide plate 5051, the lower diffuser layer 5053, the brightness enhancement film (X-BEF) having a prismatic structure, and the upper diffuser layer 5055. As can be seen in FIG. 7, in the embodiment that the backlight element 505 includes the brightness enhancement film (X-BEF) having a prismatic structure, the full width at half maximum of the display module 50 is about 25°. In the embodiment that the backlight element 505 does not include the brightness enhancement film (X-BEF) having a prismatic structure, the full width at half maximum of the display module 50 is greater than or equal to 40°.

By virtue of the structure described above, the display module 50 of the present disclosure can eliminate strong mirror reflections and make the image appear as if it were displayed on paper. In some embodiments, the display module 50 of the present disclosure can improve a color quality of an image and make the image look more like a real image by a backlight element having a local dimming function. Accordingly, a display system including the display module 50 of the present disclosure may provide higher readability, may reduce eye fatigue after prolonged use, and/or may provide better viewing.

Figure 8A:
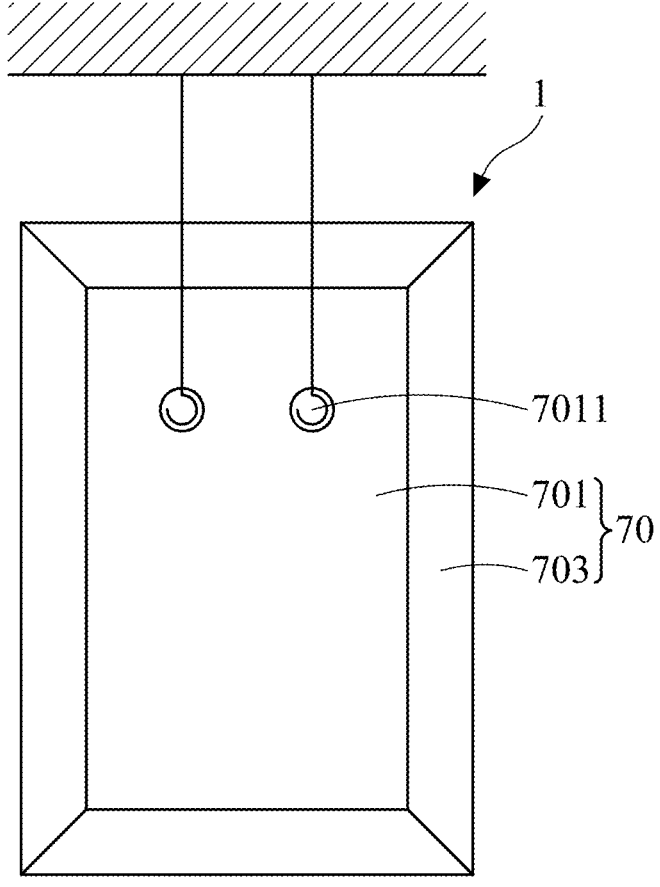
FIG. 8A is a schematic view of a backside of a display system including a decorative frame according to an embodiment of the present disclosure.
Figure 8A:
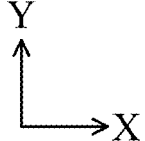
Figure 8B:
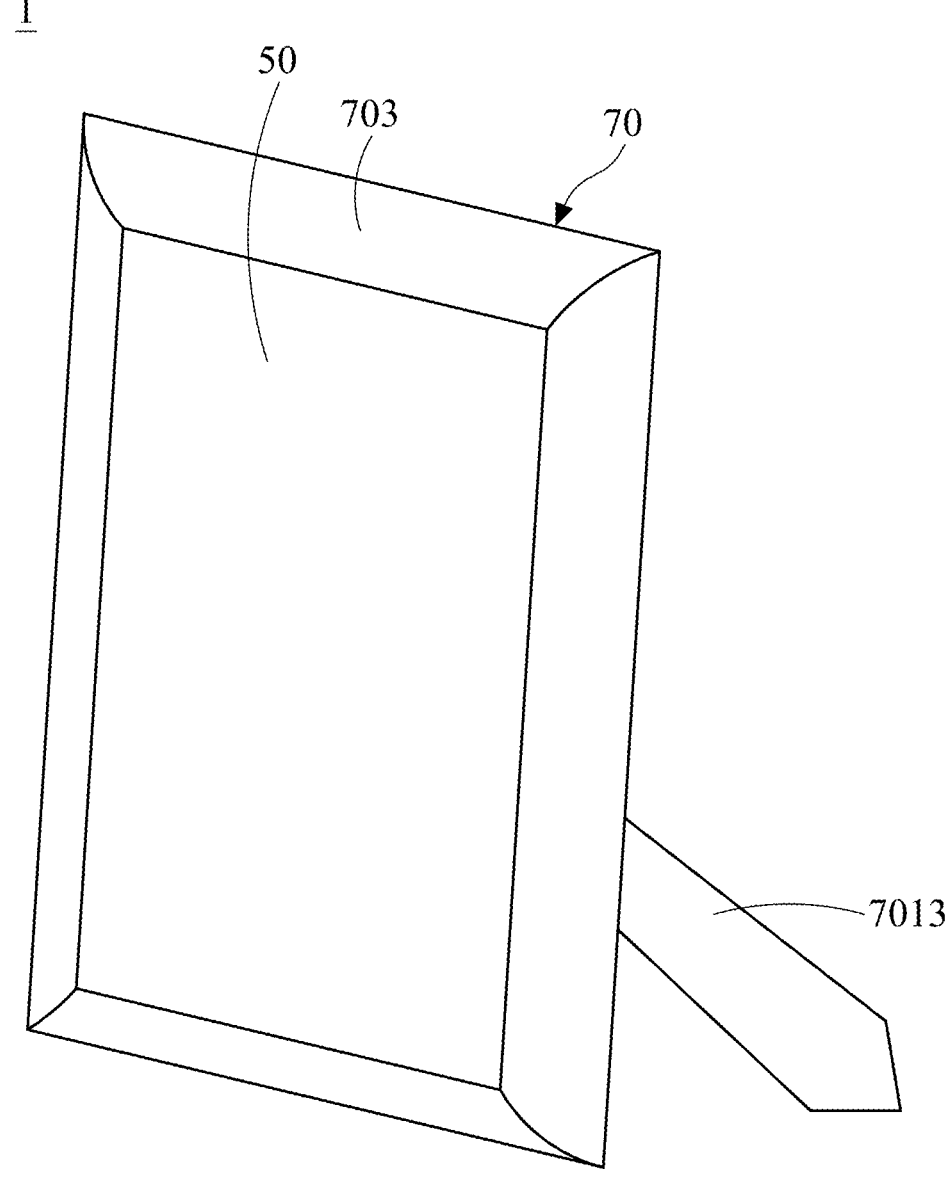
FIG. 8B is a schematic view of a display system including a decorative frame according to another embodiment of the present disclosure.
Figure 8B:
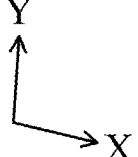

In some embodiments, the display system 1 may further include a decorative frame 70 surrounding the display panel 501. FIG. 8A is a schematic view of a backside of a display system 1 including a decorative frame 70 according to an embodiment of the present disclosure. FIG. 8B is a schematic view of a display system 1 including a decorative frame 70 according to another embodiment of the present disclosure. The decorative frame 70 may include a base plate 701 and a frame 703. The frame 703 surrounds the base plate 701 to form an accommodation space. The display module 50 may be disposed in the accommodation space, and the base plate 701 is disposed below the display panel 501. Specifically, the display panel 501 in the accommodation space may be disposed between the base plate 701 and the optical structure layer 503 in the normal direction (Z direction) of the display module 50, but the present disclosure is not limited thereto. In some embodiments, the base plate 701 may be provided with a hanging hole 7011. The decorative frame 70 can be hung on a ceiling or wall by the hanging hole 7011. The display module 50 can be hung on the ceiling or wall by the decorative frame 70 having the hanging hole 7011 as shown in FIG. 8A, but the present disclosure is not limited thereto. In other embodiments, the base plate 701 may be provided with a holder 7013 by which the decorative frame 70 may stand. The display module 50 may stand in a desired position by the decorative frame 70 having the holder 7013, as shown in FIG. 8B, but the present disclosure is not limited thereto.

Figure 9:
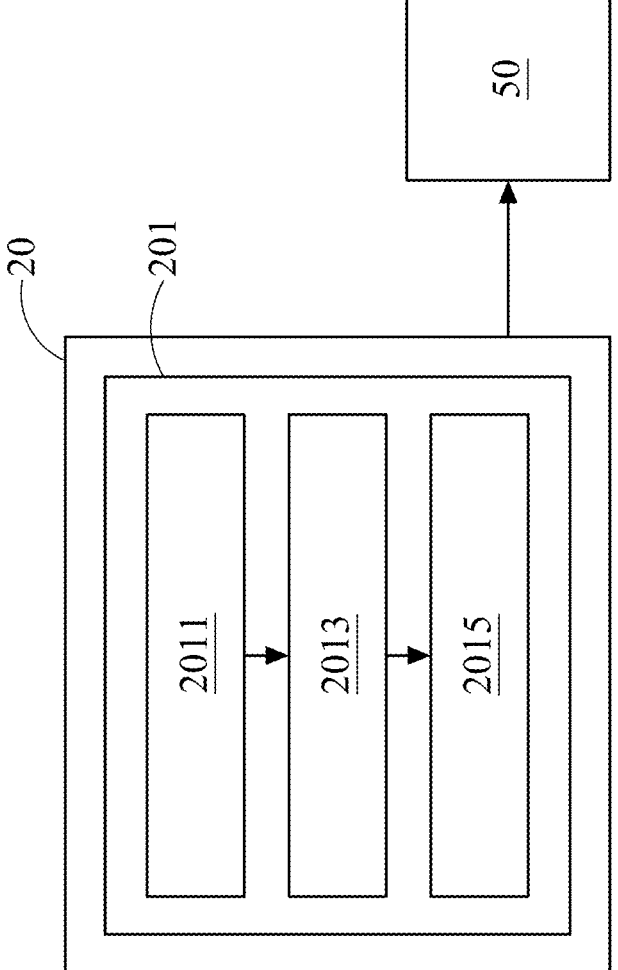
FIG. 9 is a schematic view of a display system according to another embodiment of the present disclosure.

Another aspect of the present disclosure provides a display system. FIG. 9 is a schematic view of a display system 2 according to another embodiment of the present disclosure. As shown in FIG. 9, the display system 2 may include an image generation module 20 for generating an image and a display module 50 coupled to the image generation module 20 for displaying the image. The display module 50 may include a display panel 501 and an optical structural layer 503 disposed on the display panel 501, wherein the optical structural layer 503 has a glossiness of 4 GU-35 GU and a specular component include reflectance of 3%-6%.

The image generation module 20 may include artificial intelligence (AI) software 201 or an image database. The AI software 201 may include a prompt command input unit 2011, an image generation unit 2013, and an image derivation unit 2015. The prompt command input unit 2011 is coupled to the image generation unit 2013 and the image derivation unit 2015 is coupled to the image generation unit 2013. The image generation unit 2013 generates an original image based on a prompt command from the prompt command input unit 2011 and transmits the original image to the image derivation unit 2015. The image derivation unit 2015 modifies the original image to generate an image. The image obtained after modifying by the image derivation unit 2015 may be displayed by the display module 50.

The AI software 201 may include Midjourney, Nijijourney, Stable Diffusion, or other suitable software. The embodiment that the AI software 201 includes Midjourney is used as an example to further illustrate an operation of the display system 2 of the present disclosure.

In the embodiment that the AI software 201 includes Midjourney, after opening Midjourney, the user can enter the command "/imagine" via the prompt command input unit 2011 and then press "prompt" to enter an AI drawing operation page. On the AI drawing operation page, the user can enter keywords (such as a desired image style, poem or scene description) via the prompt command input unit 2011. The image generation unit 2013 generates 4 original images for download or viewing based on the prompt command (keywords) from the prompt command input unit 2011. The image derivation unit 2015 may modify (e.g., magnify or deform) the 4 original images to produce an image, output the image to the display module 50 and display the image via the display module 50.

In some embodiments, the prompt command input to the prompt command input unit 2011 may be input by a user himself or input via an AI dialogue box such as ChatGPT, but the present disclosure is not limited thereto.

The specific structure of the display module 50 shown in FIG. 9 is substantially the same as the specific structure of the display module 50 described with reference to FIGS. 1 to 8B, and is therefore not repeated herein.

By virtue of the display module 50 of the present disclosure, the display system of the present disclosure may provide higher readability, may reduce eye fatigue after prolonged use, and/or may provide better viewing.

Although embodiments of the present disclosure and the advantages thereof have been disclosed as above, it should be understood that changes, substitutions and modifications may be made without departing from the spirit and scope of the disclosure. In addition, the protection scope of the present disclosure is not limited to the processes, machines, fabrications, compositions, devices, methods and steps in the specific embodiments described in the specification. According to the embodiments of the present disclosure, a person of ordinary skill in the art may understand that current or future processes, machines, fabrications, compositions, devices, methods and steps capable of performing substantially the same functions or achieving substantially the same results may be used in the embodiments of the present disclosure. Therefore, the protection scope of the present disclosure includes the above-mentioned processes, machines, fabrications, compositions, devices, methods and steps. In addition, features of different embodiments may be used together arbitrary as long as they do not violate the spirit of the disclosure or conflict with each other. Each claim constitutes an individual embodiment, and the protection scope of the present disclosure includes the combination of the claims and embodiments.

What is claimed is:

1. A display system, comprising:
   a host comprising a transmission interface, the host communicating with a database via the transmission interface; and
   a display module coupled to the host and comprising a display panel and an optical structure layer disposed on the display panel,
   wherein glossiness of the optical structure layer is 4 GU-35 GU, and a specular component include reflectance of the optical structure layer is 3%-6%; and
   wherein the display module has a specular component include reflectance of 0.5%-3%, and a specular component exclude reflectance of the display module is greater than 0.6 times the specular component include reflectance of the display module.

2. The display system as claimed in claim 1, wherein the database is in a Universal Serial Bus (USB) device or an Internet.

3. The display system as claimed in claim 2, wherein the Internet comprises a peer-to-peer network system.

4. The display system as claimed in claim 3, wherein the peer-to-peer network system comprises block chains.

5. The display system as claimed in claim 1, further comprising a decorative frame surrounding the display panel.

6. The display system as claimed in claim 1, wherein the display module further comprises a backlight element disposed below the display panel, and the backlight element is a local dimming backlight element.

7. The display system as claimed in claim 6, wherein the backlight element comprises a light guide plate and an upper diffuser layer and a lower diffuser layer disposed on a light-out surface of the light guide plate.

8. The display system as claimed in claim 1, wherein the glossiness of the optical structure layer is 4 GU-30 GU.

9. The display system as claimed in claim 8, wherein the glossiness of the optical structure layer is 4 GU-20 GU.

10. The display system as claimed in claim 1, wherein transmittance of the optical structure layer is 70%-95%.

11. The display system as claimed in claim 1, wherein the optical structure layer comprises an anti-glare layer and an anti-reflective layer, and the anti-reflective layer is disposed on the anti-glare layer.

12. The display system as claimed in claim 11, wherein the anti-reflective layer comprises a plurality of high refractive index sub-layers and a plurality of low refractive index sub-layers stacked alternately with each other.

13. A display system, comprising:

an image generation module for generating an image based on a prompt command input by a user; and a display module coupled to the image generation module for displaying the image, the display module comprising a display panel and an optical structure layer disposed on the display panel, wherein the optical structure layer has a glossiness of 4 GU-35 GU and a specular component include reflectance of 3%-6%; and wherein the display module has a specular component include reflectance of 0.5%-3%, and a specular component exclude reflectance of the display module is greater than 0.6 times the specular component include reflectance of the display module.

14. The display system as claimed in claim 13, wherein the image generation module comprises an image generation unit and an image derivation unit coupled to the image generation unit, the image generation unit generates an original image based on the prompt command, and the image derivation unit modifies the original image to generate the image.

15. The display system as claimed in claim 13, wherein the display module further comprises a backlight element disposed below the display panel, and the backlight element is a local dimming backlight element.

16. The display system as claimed in claim 13, wherein the glossiness of the optical structure layer is 4 GU-30 GU.

17. The display system as claimed in claim 16, wherein the glossiness of the optical structure layer is 4 GU-20 GU.

18. The display system as claimed in claim 13, wherein transmittance of the optical structure layer is 70%-95%.

19. The display system as claimed in claim 13, wherein the optical structure layer comprises an anti-glare layer and an anti-reflective layer, and the anti-reflective layer is disposed on the anti-glare layer.

20. The display system as claimed in claim 19, wherein the anti-reflective layer comprises a plurality of high refractive index sub-layers and a plurality of low refractive index sub-layers stacked alternately with each other.

21. A display system, comprising:

a host comprising a transmission interface, the host communicating with a database via the transmission interface; and a display module coupled to the host and comprising a display panel and an optical structure layer disposed on the display panel, wherein the glossiness of the optical structure layer is 4 GU-35 GU, and a specular component include reflectance of the optical structure layer is 3%-6%; and wherein the display module has a glossiness of 0 GU-10 GU and a specular component exclude reflectance of the display module is greater than 0.6 times a specular component include reflectance of the display module.

22. A display system, comprising:

an image generation module for generating an image based on a prompt command input by a user; and a display module coupled to the image generation module for displaying the image, the display module comprising a display panel and an optical structure layer disposed on the display panel, wherein the optical structure layer has a glossiness of 4 GU-35 GU and a specular component include reflectance of 3%-6%; and wherein the display module has a glossiness of 0 GU-10 GU and a specular component exclude reflectance of the display module is greater than 0.6 times a specular component include reflectance of the display module.

* * * * *